Nov. 19, 1957  M. J. BERLYN  2,813,492

BALL PUMP

Filed Dec. 14, 1953

INVENTOR.
MARTIN J. BERLYN
BY
Raymond A. Paquin
ATTORNEY.

United States Patent Office 2,813,492
Patented Nov. 19, 1957

2,813,492

BALL PUMP

Martin J. Berlyn, Schenectady, N. Y., assignor to American Bosch Arma Corporation, a corporation of New York Application December 14, 1953, Serial No. 397,858

1 Claim. (Cl. 103—161)

This invention relates to pumps and has particular reference to a new and improved ball pump which is relatively simple and compact in construction and efficient in operation.

The principal object of the invention is to provide a new and improved ball pump.

Another object of the invention is to provide a ball pump which is balanced.

Another object is to provide a pump of the type set forth which combines the compactness of a gear pump and the leak proof seal of a plunger pump.

Another object is to provide a pump of the type set forth wherein means is provided for hydraulically balancing the pintle valves.

Other objects and advantages will be apparent from the following description taken in connection with the accompanying drawing. It will be understood that changes may be made in the details of construction and arrangement of parts shown and described, as the preferred form has been given by way of illustration only.

Referring to the drawing.

Figure 1:
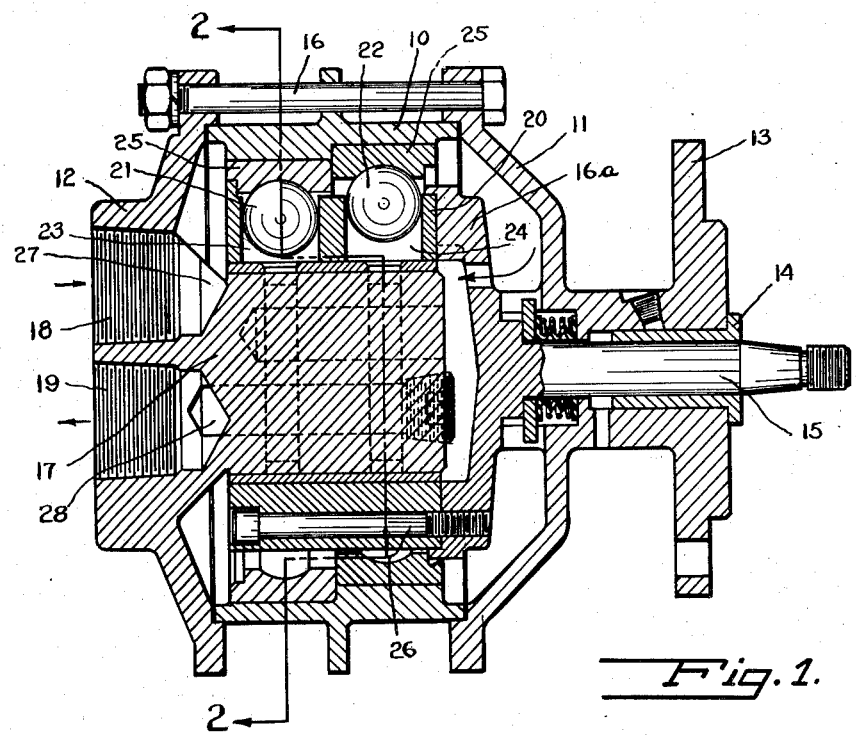
Fig. 1 is a longitudinal sectional view of a pump embodying the invention.
Figure 2:
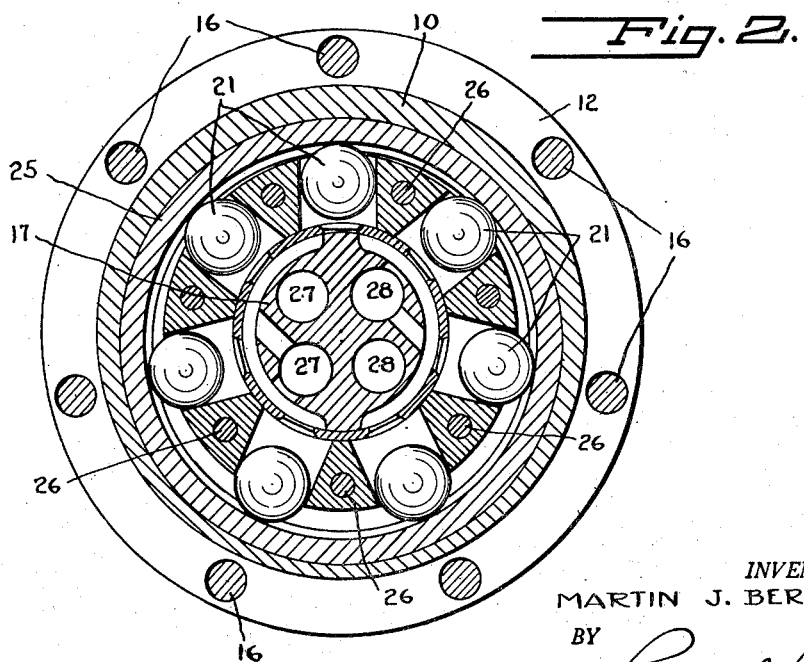
Fig. 2 is a sectional view taken on line 2—2 of Fig. 1, looking in the direction of the arrows.

Referring more particularly to the drawing wherein similar reference characters designate corresponding parts throughout, the pump comprises the ball race housing 10 having open ends adapted to be closed by a cover 11 and the cover member 12.

The mounting flange assembly 13 is provided for securing the pump in operative position and has the bearing 14 in which is journaled the pump drive shaft 15.

The ball race housing 10, cover 11 and cover member 12 are secured together by means of the bolts 16.

Within the housing and therewithin formed integral with the drive shaft 15, is the flanged drive member 16a which can be formed separately, if desired, or secured to drive shaft 15.

Also within the housing is provided the pintle valve 17 which may be formed integral with cover member 12 or separately and connected thereto, as desired. Cover member 12 has the inlet port 18 and the outlet port 19 with inlet port 18 adapted to be connected to the source of fluid at supply pressure, for example, 15 to 20 p. s. i. and the outlet or discharge port 19 is adapted to be connected to a jet engine, or the like, for supplying fuel thereto.

Surrounding pintle valve 17 is the ball cage assembly 20 which may have two rows of balls 21 and 22 in aligned cylinders 23 and 24, as shown, although a larger number of cylinders and balls could be employed depending upon the output desired from the pump. The number of cylinders and balls should preferably be an even number, that is 2, 4, 6, etc.

Surrounding each row of balls is a ball race or ring 25 and as will be seen from Fig. 1, the rings are offset in diametrically opposed directions. If, as stated above, a greater number of rows of balls or cylinders were employed one-half of said rows would have their track or ring 25 displaced on one side and the other half would be displaced in the other direction.

It will be seen that because of the opposite displacement of the rings or balls that balance is obtained in the pump.

It will be seen that while the pump shown is adapted to provide a constant output, that the pump could be adapted to provide a variable capacity or output.

It will be noted that the ball race housing 10 is eccentric relative to pintle valve 17.

It will also be seen that the ball cage assembly 20 is secured to the flange portion 16a on drive shaft 15 by means of bolts or screws 26 whereby rotation of drive shaft 15 effects rotation of ball cage housing 20 for effecting pumping action by the pump.

It is also pointed out that each of the bores of cylinders 24 is honed to exact size and the ball pistons 22 are lapped to a fluid sealing fit within the cylinders.

The inlet port 18 provides fluid under supply pressure into all of the cavities of the pump through ducts 27 in pintle valve 17 and fluid under discharge pressure or high pressure is simultaneously pumped by ball pistons in diametrically opposite cylinders, whereupon, fluid from said diametrically opposite cylinders passing through duct 28 to outlet port 17, and this diametrical opposite pumping of high pressure fluid which is effected because of the opposite displacement of the rings 25, and balance force is thereby provided within the pump.

In operation, fluid is supplied through the inlet port 18 under supply pressure as previously stated, and rotation of the cage 20 by rotation of drive shaft 15 flanges the ball pistons 22 around in an orbit. The ball pistons 22 are always in contact with the ring 25 and are pressed quickly against said ring by centrifugal force and supply pressure.

The eccentric position of the ring 25 forces each ball plunger 22 in turn toward pintle valve 17 on its pumping stroke and this effects successive strokes of each of the balls progress upon rotation of drive shaft 15 and ball cage 20 and, thereby, effects a continuous pumping action by the ball plungers and the fluid pump thereby is delivered through the outlet 19 and a pipe line to a desired object, such as a jet engine.

From the foregoing it will be seen that I have provided simple, efficient and economical means for obtaining all of the objects and advantages of the invention.

I claim:

In a device of the character described, an open ended cylindrical housing, covers closing the open ends of said housing and extending beyond the periphery of said housing, fastening means connecting said covers beyond the periphery of said housing for securing said cylindrical housing and covers in assembled relation, one of said covers having fluid inlet and outlet passages, a ported pintle valve element integral with one of said covers within said housing having fluid inlet and outlet passages communicating with said fluid inlet and outlet passages in said cover, a rotor in said housing carrying the complementary portion of said pintle valve and snugly engaging said ported pintle valve element, a drive shaft for effecting rotation of said rotor, a plurality of radially disposed cylinders arranged in two banks each lying in a plane normal to said pintle valve in said rotor, a ball piston member in each of said cylinders and a track member surrounding each of said banks of cylinders and eccentrically positioned relative to said housing in diametrically opposed directions and adapted to effect pumping action of each of said ball piston members successively upon rotation of said rotor, said fluid inlet passage and said fluid outlet passage in said pintle valve communicating with diametrically opposed pumping cylinders simultaneously for hydraulically balancing said pintle valve.

References Cited in the file of this patent

UNITED STATES PATENTS

| | | |
|---|---|---|
| 2,453,538 | Rauch | Nov. 9, 1948 |
| 2,646,755 | Joy | July 28, 1953 |
| 2,675,764 | McGee | Apr. 20, 1954 |
| 2,682,837 | Schira | July 6, 1954 |